US009068651B2

(12) United States Patent  
Ye et al.

(10) Patent No.: US 9,068,651 B2  
(45) Date of Patent: Jun. 30, 2015

(54) STATE TRANSITION CONTROL FOR A MULTI-MODE HYBRID POWERTRAIN

(71) Applicant: GM GLOBAL TECHNOLOGY OPERATIONS LLC, Detroit, MI (US)

(72) Inventors: Shaochun Ye, Northville, MI (US); Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 13/901,679

(22) Filed: May 24, 2013

(65) Prior Publication Data

US 2014/0350803 A1    Nov. 27, 2014

(51) Int. Cl.
    *G06F 7/00*     (2006.01)
    *F16H 61/68*    (2006.01)
    *B60W 10/06*    (2006.01)
    *B60W 10/08*    (2006.01)
    *B60W 20/00*    (2006.01)

(52) U.S. Cl.
    CPC ............... *F16H 61/68* (2013.01); *B60W 10/06* (2013.01); *B60W 10/08* (2013.01); *B60W 20/10* (2013.01); *B60W 20/40* (2013.01)

(58) Field of Classification Search
    CPC ..... B60W 10/06; B60W 10/08; B60W 20/10; B60W 20/40; B60W 30/192; Y02T 10/6286; Y02T 10/7258
    See application file for complete search history.

(56) References Cited

U.S. PATENT DOCUMENTS

| | | | | |
|---|---|---|---|---|
| 7,315,774 | B2 * | 1/2008 | Morris | 701/53 |
| 8,386,140 | B2 * | 2/2013 | Tsuda et al. | 701/60 |
| 8,700,279 | B2 * | 4/2014 | Hansen et al. | 701/67 |
| 8,781,659 | B2 * | 7/2014 | Kim | 701/22 |
| 2009/0112422 | A1 * | 4/2009 | Sah et al. | 701/60 |
| 2012/0065856 | A1 * | 3/2012 | Hansen et al. | 701/67 |

* cited by examiner

*Primary Examiner* — David D Le  
(74) *Attorney, Agent, or Firm* — Quinn Law Group, PLLC

(57) ABSTRACT

A powertrain includes a controller and gear sets, clutches, rotatable members, and torque actuators, e.g., an engine and one or more motor/generator units. Each torque actuator outputs a total control torque. The total control torque from a given actuator is used to achieve a target value, which is a torque value of a member of one of the gear sets, clutches, or rotatable members. The controller includes proportional-integral (PI) control logic. The total control torque is the sum of proportional and integral torque terms from the PI control logic. The controller detects a predetermined vehicle event, for instance a change in a hybrid range state or a control gain reduction event, and then automatically resets the integral control torque term(s) for the physical target value during the requested vehicle event to thereby maintain the total control torque for the same target value through the execution of the predetermined vehicle event.

16 Claims, 3 Drawing Sheets

| | N1 | | N2 | |
|---|---|---|---|---|
| TGT | $A_V$ | $A_P$ | $A_V$ | $A_P$ |
| $T_i$ | 3 | (12) | 1 | $M_A, M_B$ |
| $T_{C1}$ | 1 | $M_A, M_B$ | 2 | $M_A, M_B$ |
| $T_{C3}$ | 2 | $M_A, M_B$ | 0 | N/A |

FIG. 5

STATE TRANSITION CONTROL FOR A MULTI-MODE HYBRID POWERTRAIN

TECHNICAL FIELD

The present disclosure is related to a system and method for controlling a state transition in a multi-mode hybrid transmission.

BACKGROUND

A hybrid powertrain improves a vehicle's fuel economy relative to a conventional powertrain via the selective use of different torque generating devices. The various torque generating devices of a hybrid powertrain, which are also referred to as torque actuators, are selected by a hybrid controller based on present range state torque requirements. Typical hybrid torque actuators include an internal combustion engine and one or more electric motor/generators. Output torque generated by the torque actuators is ultimately transferred through one or more gear sets of a transmission to an output member, which is connected in turn to the drive axle(s) of the vehicle.

A strong hybrid driveline system controls multiple torque actuators in a closed loop using proportional-integral (PI) or proportional-integral-derivative (PID) control logic so as to achieve a desired target value, such as a desired engine or clutch rotational torque, speed, or a desired level of driveline damping. However, even using PI or PID control logic, it may be difficult to maintain smooth closed-loop control during certain transitional vehicle events, for instance during a hybrid state transition or a control gain reduction event.

SUMMARY

A hybrid powertrain is disclosed herein that includes a controller and multiple torque actuators such as an engine and one or more electric motor/generator units. The controller ensures that a continuous closed-loop total control torque that is commanded to achieve a physical target value, e.g., an engine or clutch rotational speed, regardless of a change in the identity of the torque actuator(s) used to achieve the target value. The present control scheme is intended to help render a predetermined vehicle event, e.g., a hybrid state transition or a control gain reduction event, as imperceptible to a driver as possible, regardless of the physical torque actuator used for achieving the target value.

The controller operates in part by resetting the integral torque for the target value in a specific manner that ensures a substantially continuous total closed-loop torque for the target value being controlled. As is well known in the art, the term "total control torque" in PI control logic is the sum of the proportional (P) and integral (I) torque terms. The present approach may be used with strong hybrid powertrains and other multi-mode dynamic systems to avoid driver-perceptible speed oscillations or "bumps" typically caused by a discontinuous closed-loop control torque, and/or from a carryover of an erroneous control history for the controlled target value immediately after the predetermined vehicle event.

In a particular embodiment, the powertrain includes a plurality of gear sets, clutches, rotatable members, and torque actuators, e.g., an engine and one or more motor/generator units. The torque actuators output a total control torque for achieving a target value, such as a torque or a speed of a member of one of the gear sets, clutches, or rotatable members. The powertrain also includes a controller having a processor, memory, and proportional-integral (PI) control logic recorded in the memory.

The controller in this embodiment detects the predetermined vehicle event. In response to the detected event, the controller automatically resets an integral control torque term for the target value during the predetermined vehicle event. Automatically resetting the integral control torque term is done in such a manner as to maintain the total control torque for the target value through the execution of the predetermined vehicle event, regardless of the identity of the physical torque actuator used to achieve the target value.

A controller for the powertrain noted above includes a processor, a transceiver in communication with the powertrain, and memory having proportional-integral (PI) control logic. The processor executes code from the memory to thereby cause the controller to detect, via the transceiver, a predetermined vehicle event, and to automatically reset an integral control torque term for each of the physical torque actuators used to achieve the physical target value immediately after the requested vehicle event. The controller maintains the total control torque of the same target value through the execution of the predetermined vehicle event.

Another powertrain is disclosed herein that includes a stationary member, first, second, and third gear sets each having a plurality of nodes, a plurality of clutches, rotatable members, and torque actuators, and a controller. Each clutch is selectively engageable to connect some of the gear sets to each other or to the stationary member. The torque actuators include an engine, a first motor/generator unit, and a second motor/generator unit, a controller having a processor, memory, and PI control logic recorded in the memory. The controller detects, via the transceiver, a hybrid range state transition, and automatically resets the integral control torque term for the target value during the hybrid range state transition. In doing so, the controller resets the integral control torque terms of a corresponding virtual actuator used for the same target value, and then transforms the virtual actuators to the physical actuators in logic of the controller. As with the other embodiments, automatically resetting the integral control torque terms maintains the total control torque of the same target value through the execution of the hybrid range state transition.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 5 is a table describing the example hybrid range state transition for the parameters shown in FIG. 4.

DETAILED DESCRIPTION

Figure 1:
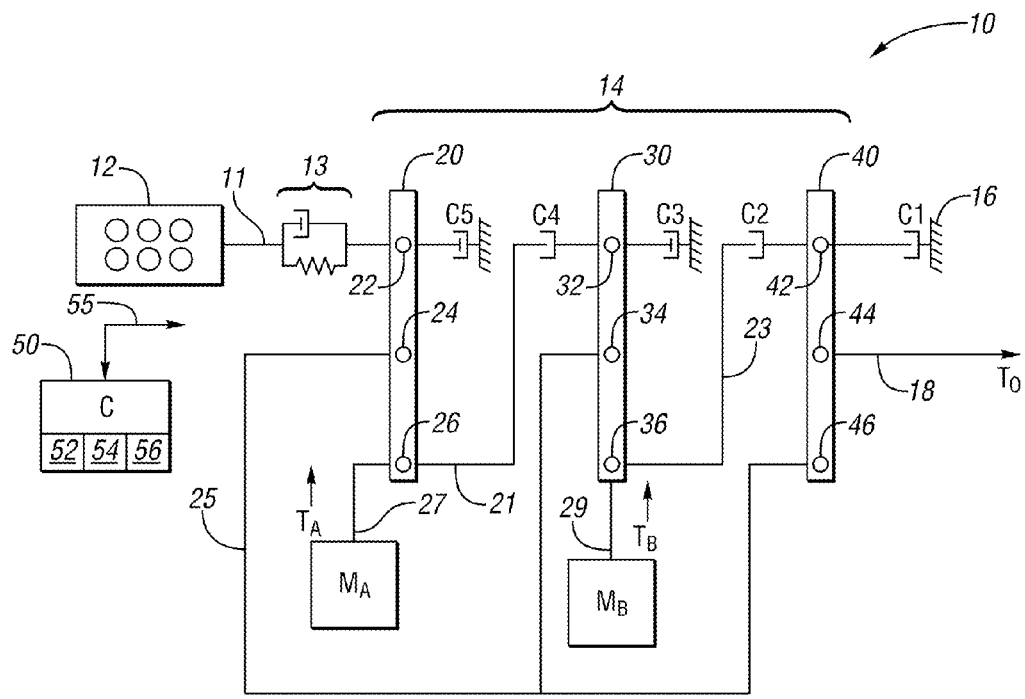
FIG. 1 is a schematic illustration of an example multi-mode hybrid vehicle powertrain that is controlled via a method as set forth herein.

Referring to the drawings, wherein like reference numbers refer to like components throughout the several Figures, an example powertrain 10 is shown schematically in FIG. 1. The powertrain 10 includes multiple physical torque generating devices, hereinafter referred to as torque actuators. In the configuration that is shown, the torque actuators include an internal combustion engine 12 and respective first and second motor/generator units $M_A$ and $M_B$. Different torque actuators may be used in other embodiments, such as more or fewer motor/generator units.

The control approach described herein may be used with any multi-mode dynamic system to avoid speed oscillations caused by a discontinuous closed-loop, total control torque, and/or from carryover of an erroneous control history typically captured via the integral (I) torque term of a proportional-integral (PI) control scheme. A controller 50 executes logic to achieve the desired control ends during a predetermined vehicle event. As used herein, the term "predetermined vehicle event" may be any event in which the identity of the physical torque actuator or actuators used to achieve a given target value changes. Example events of this type may include a hybrid range state transition and a control gain reduction event, the latter of which is described in more detail below. The details of the control approach of the present invention are set forth below with reference to FIGS. 2-5.

In the example configuration of FIG. 1, the powertrain 10 includes a transmission 14 having three planetary gear sets 20, 30, and 40, a stationary member 16 such as a transmission housing, and various rotating and braking clutches C1-C5. Closed-loop total control torques may be commanded via the controller 50 on specific target values to be achieved, for instance a desired rotational speed of the engine 12, the motor/generator units $M_A$ and/or $M_B$, the clutches C1-C5, and/or any other values such as damping torque, slip speeds, etc., any of which may be controlled via a torque from a given one of the torque actuators.

The transmission 14 may include, as a rotatable member, an input member 11 and an output member 18, with the latter delivering a transmission output torque (arrow $T_O$) to the drive wheels (not shown). This value may represent an active damping torque for reducing driveline noise, vibration, and harshness (NVH) effects. A clutch and damper assembly/input assembly 13 may be disposed between the engine 12 and the transmission 14 to selectively connect and disconnect the engine 12 from the driveline as needed, and thus to similarly damp any undesirable NVH effects due to such a selective input connection. The gear sets 20, 30, and 40 each include multiple nodes which represent, in a representative planetary arrangement, a sun gear, a ring gear, or a carrier member, as is well known in the art.

For instance, the gear set 20 shown in FIG. 1 may include nodes 22, 24, and 26, while the gear set 30 may include nodes 32, 34, and 36. Likewise, the gear set 40 may include nodes 42, 44, and 46. In the example configuration shown in FIG. 1, the motor/generator units $M_A$ and $M_B$ may be directly connected to respective nodes 26 and 36 via a corresponding interconnect member 27 and 29 as shown. Nodes 24, 34, and 46 may be connected to each other via another interconnect member 25. Node 42 of the gear set 40 may be selectively connected to the stationary member 16 via the clutch C1, e.g., a braking clutch. Clutch C2, shown here as a rotating clutch, is selectively engaged to connect node 36 of the gear set 30 to node 42 of the gear set 40 via interconnecting member 23. Clutch C3 may be a braking clutch connecting node 32 of gear set 30 to the stationary member 16. Clutch C4, which is also a rotating clutch in the example of FIG. 1, is engaged to connect node 32 of the gear set 30 to node 26 of the gear set 20. Clutch C5, also a braking clutch, in turn is engaged to connect node 22 of the gear set 20 to the stationary member 16.

The controller 50 may be embodied as a computer device or networked devices including a processor 52, computer-readable tangible, non-transitory memory 54, and a transceiver 56, some of which may be arranged on a printed circuit board or otherwise sufficiently housed in the vehicle 10. Instructions embodying the present method for smoothing a total control torque may be recorded in the memory 54 and executed as needed via the processor 52 to provide the functionality described herein. Memory 54 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, a digital signal processor, and any necessary input/output (I/O) devices and other signal conditioning and/or buffer circuitry.

In particular, the controller 50 of FIG. 1 is configured to ensure, via control signals (double-headed arrow 55) to the transmission 14, that a total control torque commanded on a given physical target value remains sufficiently smooth or unchanged, for instance within ±1% of the values immediately prior to and after the predetermined vehicle event, with an ideal control case of zero variance in the target value immediately before and after the predetermined vehicle event. As noted above, in addition to a change in hybrid range state, such an event may include a control gain reduction event. For instance, a battery (not shown) sufficient for powering the motor/generator units $M_A$ and $M_B$ may at times have a threshold low state of charge, such that the motor/generator unit $M_A$ or $M_B$ cannot provide a total control torque commanded of it by the controller 50. In such a case, the controller 50 may decide to send the same torque request to the engine 12, which is a slow actuator relative to the actuation speeds available via the motor/generator units $M_A$ and $M_B$. Thus, the control gain for the engine 12 is reduced to ensure sufficient control stability, and hence, a "control gain reduction event" occurs.

Additionally, the concept of a "virtual" torque actuator may be used in control planning and execution to represent the desired point of application of a torque from an actual physical actuator of a powertrain such as the powertrain 10 of FIG. 1. A virtual torque actuator is treated, for the purposes of control planning, as being the controlled target value. In a virtual actuator approach in the powertrain 10, there may be as many as three physical torque actuators, i.e., the engine 12 and the motor/generators $M_A$ and $M_B$, and up to three virtual actuators for a given target value. Each virtual actuator may be configured per hybrid range state to represent the torque on a given physical target value, such as input shaft torque (arrow Ti), the torque on clutch C1, the torque on clutch C3, or output shaft torque (arrow $T_O$), i.e., a damping torque.

The number of degrees of freedom for a given hybrid range state determines how many physical target values are required for control. In other words, one virtual actuator represents one physical target value. The example range state of Neutral 1 shown in FIG. 5 and discussed below has three degrees of freedom, and thus three independent target values. As a result, three virtual actuators are required for control of this target value, in this instance the target values of input torque (Ti), C1 torque, and C2 torque. By way of comparison, Neutral 2 has only two degrees of freedom and thus two target values for control, i.e., Ti, and C1 torque. The number of degrees of freedom/target values is not limited to just two or three, and thus the present approach may be readily extended to other powertrain configurations without departing from the intended inventive scope.

Figure 2:
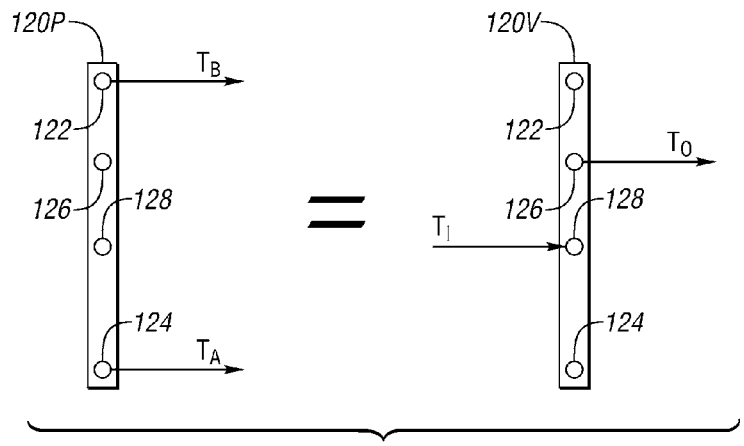
FIG. 2 is a set of schematic lever diagrams describing an equivalence of an example physical and virtual torque actuator configuration.

As shown in the left-hand gear set 120P of FIG. 2, one or more physical torque actuators such as the engine 12 or motor/generator units $M_A$ or $M_B$ of FIG. 1 are physically connected to the driveline and act indirectly on a particular shaft, such as the output shaft 18 of FIG. 1, or one of the nodes of the gear sets 20, 30, or 40. That is, motor torque (arrow $T_B$) from motor/generator unit $M_B$ may be required at node 122, and motor torque (arrow $T_A$) from motor/generator unit $M_A$ may be required at node 124. In a virtual torque representation, as shown via the right-hand gear set 120V, control torques may be shown as a desired output torque (arrow $T_O$) at node 126 and a desired input torque (arrow $T_I$) acting node 128.

Using such an approach, control logic may be designed as if a desired total torque acts directly at a given node or on a given shaft as shown, as opposed to acting indirectly through intervening elements at any of the other nodes to which the actuators are actually connected. Part of the subsequent control approach, therefore, would entail converting the torques from their virtual values back to actual torque commands to be commanded by the motor/generator units $M_A$, $M_B$. In other words, one can plan powertrain control logic using a single input and output torque as shown in the gear set 120V, then map these values back to the required output torques from the various physical actuators, e.g., the engine 12 and/or motor/generator units $M_A$, $M_B$, using known powertrain design characteristics.

Figure 3A:
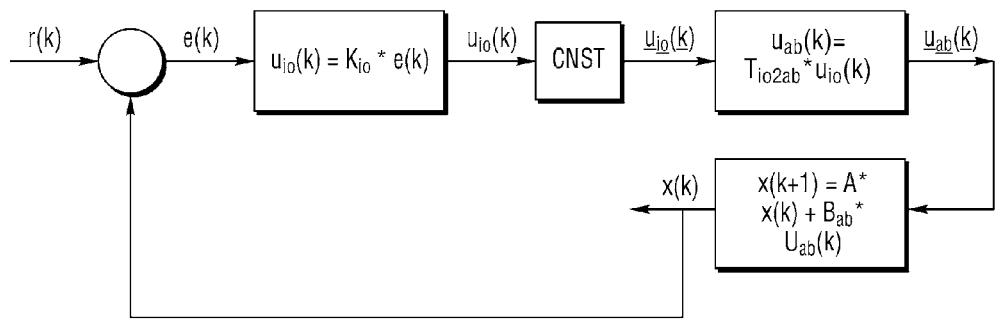
FIG. 3A is a schematic logic flow diagram for an example virtual torque actuator control implementation.

Referring to FIG. 3A, an example transformation matrix may be used to transform a dynamic system from one which uses physical actuators such as the motor/generator units $M_A$, $M_B$ into one which uses virtual actuators at specific points of the driveline, as noted above. The virtual actuators may be selected such that they can be aligned with independent control functions, thereby allowing each control function to be executed under its own unique operating constraints without affecting the output of other functions.

The operation of a given physical torque actuator may be described as shown in the logic flows of FIG. 3A and FIG. 3B by expressing independent virtual control gains mathematically as follows:

$$u_{io}(k)=K_{io}*e(k)$$

where the value $u_{io}(k)=[T_1$ (speed control); $T_O$ (damping)]. Constraints (CNST) for the actuator are applied to $u_{io}(k)$ to produce $\underline{u}_{io}(k)$. For FIG. 3B, the inputs and outputs are the physical actuators a and b, e.g., motor/generator units $M_A$ and $M_B$, which replace i and o, respectively, in this formula. The constrained output may be transformed to the physical actuators, e.g., $M_A$, $M_B$ in this example, as:

$$u_{ab}(k)=T_{io2ab}*u_{io}(k)$$

wherein $T_{io2ab}$ is a transfer function between the virtual torque actuators and the physical torque actuators, and may be defined in accordance with the following relationship.

$$T_{ab2io}=inV(T_{io2ab})$$

Figure 3B:
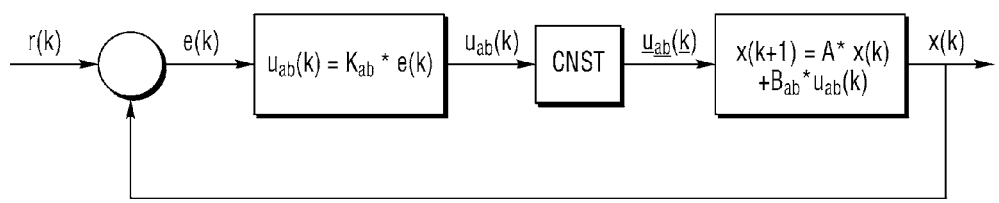
FIG. 3B is a schematic logic flow diagram for an example physical torque actuator control implementation.

A first system dynamics equation may then be determined as follows, as shown in FIG. 3B:

$$x(k+1)=A*x(k)+B_{ab}*[u_{ab}(k)]$$

where A is an application-specific scalar vector, x(k) is a response vector for the transmission 14 of FIG. 1, $B_{ab}$ is an application-specific vector associated with the physical torque actuators in which the relationship between Ta, Tb, Ti, and To is embedded, and $u_{ab}(k)$ is a control vector associated with the virtual torque actuators, and $u_{ab}(k)$ is a control vector associated with the physical torque actuators.

In FIGS. 3A and 3B, feedback gains, $K_{ab}$ and $K_{io}$ may be defined in accordance with the following relationships.

$$K_{ab}=T_{io2ab}*K_{io}$$

$$K_{io}=T_{ab2io}*K_{ab}$$

Input torque ($T_I$) matrices may be defined in accordance with the following relationships.

$$B_{ab}=B_{io}*T_{ab2io}$$

Thus, the control vector for the physical torque actuators can be transformed to a control vector for the virtual torque actuators using a transformation matrix or transfer function, shown in FIG. 3A as:

$$u_{ab}(k)=T_{io2ab}*u_{io}(k)$$

wherein $T_{io2ab}=\text{inv}(B_{ab}^T B_{ab})B_{ab}^T B_{io}$

The transformation matrix or transfer functions explained above transform a dynamic system from one which uses the physical actuators, e.g., motor/generator units $M_A$ and $M_B$, as actuators to one which uses only virtual torque actuators applied at selectable points in the driveline. The virtual torque actuators can be chosen such that they can be aligned with independent control functions of interest to the operator or such that they can be aligned with independent control functions of interest in the control system. This permits each of the control functions to be executed under its own constraints (CNST) without affecting the output of the other control functions, thus controlling one of the virtual torque actuators independently of the other virtual torque actuators.

The illustration in FIGS. 3A and 3B uses a transformation matrix or transfer function to transform between a control vector for the physical torque actuators and a control vector for the virtual torque actuators using physical torque actuators of the first and second torque actuators and virtual torque actuators of the input member and output member. Other transformation matrices or transfer functions can be developed to transform between a control vector for the physical torque actuators and a control vector for the virtual torque actuators, wherein the virtual torque actuators include selected ones of the input member, a selected clutch, the output member, and other actuators or nodes on a representative transmission lever diagram without limitation.

Figure 4:
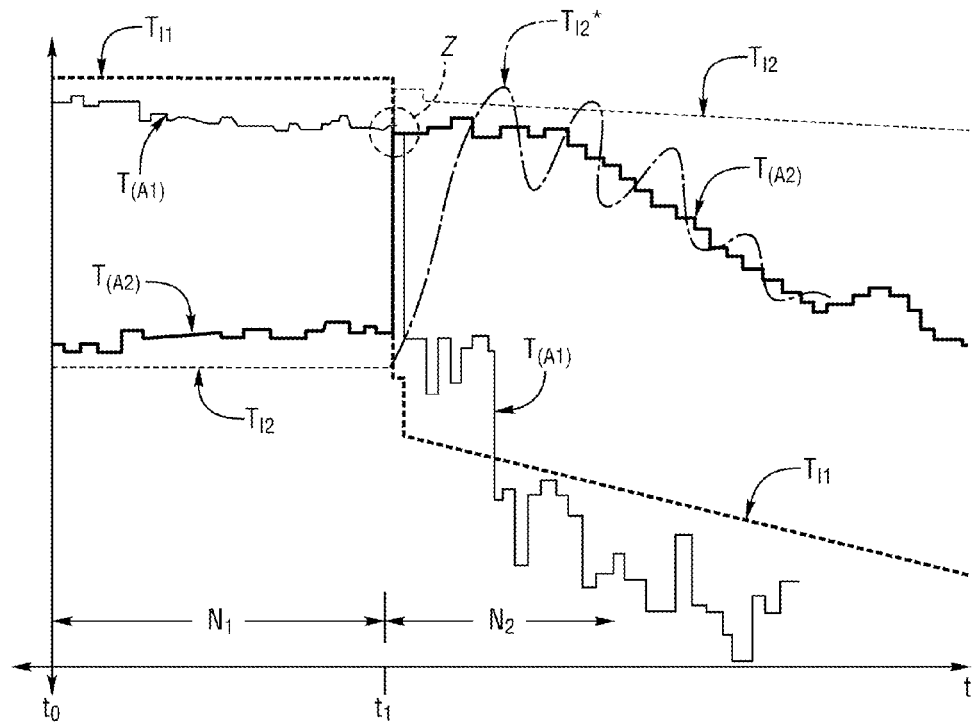
FIG. 4 is a schematic time plot of changing control parameters through an example hybrid range state transition, with time plotted on the horizontal axis and torque magnitude plotted on the vertical axis.

Referring to FIG. 4, an example predetermined vehicle event in the form of a Neutral 1 (N1) to Neutral 2 (N2) hybrid range state transition is shown via a time plot of changing torque magnitude. For each physical actuator used, e.g., the engine 12 and the motor/generator units $M_A$, $M_B$, the controller 50 of FIG. 1 includes, in its core logic and associated hardware, a corresponding PI controller. As is well known in the art, the integral (I) term of a PI control scheme accumulates error, i.e., the term e(k) in FIGS. 3A and 3B. Therefore, a key control step of the controller 50 is to reset the integral torque term of a total control torque determined via the controller 50 when switching gears, as opposed to carrying over the accumulated error in the normal manner.

The controller 50 of FIG. 1 resets the integral torque term for a given virtual actuator in such a way that the total torque for the physical target is continuous, or substantially so, between the previous and the newly commanded hybrid range states. For instance, a given input speed (Ni) to the transmission 14 of FIG. 1 may be provided in one hybrid range state by the engine 12 acting alone. In the next hybrid range state, however, the engine 12 may be turned off or disconnected from the driveline, and the motor/generator units $M_A$ and/or $M_B$ may provide the torque needed for maintaining this required target speed. The transition from one physical actuator set to another can result in a disturbance that is perceptible to a driver, something the controller 50 is configured to avoid.

The example N1-to-N2 range shift occurs at about $t_1$. The magnitude (vertical axis) of each trace is plotted versus time (t) on the horizontal axis. The total torques of respective first and second virtual actuators A1, A2 are represented as traces $T_{(A1)}$ and $T_{(A2)}$. The integral torque terms for these virtual actuators, i.e., the I term in a PI control scheme, are represented as traces $T_{I1}$ and $T_{I2}$. In a typical range transition or shift, a torque "sag" or "push" may result in an input torque due to carryover of an incorrect actuator control history, i.e., the integral torque term from a prior state, as control passes from one physical actuator to another. Trace $T_{I1}$* illustrates a typical PI control response absent the present control approach. Such a result may be perceptible to a driver of the vehicle 10, as the integral torque in this instance is not reset, but rather accumulates and carries over into the new range state. A discontinuity may therefore result in zone Z, i.e., a disruption in the total torque. In the same zone Z using the present approach, this transition is continuous.

To achieve the desired result, the controller 50 of FIG. 1 resets the integral torque for the second virtual actuator (A2) such that the total torque on the physical target, e.g., clutch torque or speed, is unchanged. In other words, the total torque for the first virtual actuator $T_{(A1)}$ meets the total torque for the second virtual actuator $T_{(A2)}$ without a perceptible discontinuity.

Referring to FIG. 5, in the same N1-to-N2 range shift of FIG. 4, the physical target values (TGT) may be an input torque (Ti), a C1 torque ($T_{C1}$), and a C3 torque ($T_{C3}$). The corresponding virtual actuators ($A_V$) may be, in range state N1, the virtual actuators 3, 1, and 2, respectively. Corresponding physical actuators ($A_P$) in range state N1 may be the engine 12 for virtual actuator 3, the motor/generator units $M_A$ and $M_B$ for virtual actuator 1, and the same motor/generator units $M_A$ and $M_B$ for virtual actuator 2, perhaps in a different torque combination or ratio. In the new hybrid range state N2, for the same physical target values, the virtual actuators may change, e.g., as actuators 1 and 2 only. That is, virtual actuator 1 may now control the input torque (Ti) and correspond to the motor/generator units $M_A$ and $M_B$, and the virtual actuator 2 may now control the C1 torque, also via the motor/generator units $M_A$ and $M_B$.

Thus, the total control torque from the controller 50 for the virtual actuator 1, i.e., $T_{1T}$, in the new hybrid range state at time (k+1) must equal the total control torque of the virtual actuator 3, or $T_{3T}$, at the end of the immediately prior hybrid range state, i.e., the virtual actuator for the target value at time (k). Likewise, the total control torque for virtual actuator 2, or $T_{2T}$, in the new hybrid range state at (k+1) must equal the total torque of virtual actuator 1, i.e., $T_{1T}$, at the end of the prior hybrid range state at time (k). This required relationship used in the execution of the present method may be represented mathematically in logic of the controller 50 as:

$$T_{1T}(k+1)=T_{3T}(k)$$

$$T_{2T}(k+1)=T_{1T}(k)$$

Therefore, the controller 50 of FIG. 1 is configured to reset the integral torque upon detection of a requested transition to the new range state as follows:

$$T_{1I}(k+1)=T_{3I}(k)+T_{3P}(k)-T_{1P}(k+1)$$

$$T_{2I}(K+1)=T_{1I}(k)+T_{1P}(k)-T_{2P}(k+1)$$

where the subscript P represents the proportional torque term for the indicated virtual actuator. The latter example is shown in FIG. 4. Thus, as part of the underlying control method, the controller 50 may detect a requested hybrid range shift, or alternatively a control gain reduction event. Thereafter, the controller 50 can determine the proportional and integral torque terms of the virtual actuators using the above approach, and then smoothly reset the integral torque terms according to the above equations.

In a complex system such as a multi-mode hybrid powertrain of the type shown in FIG. 1, a smooth actuator torque during a hybrid state transition does not necessarily translate to smooth torque reaction on a physical target value. This is particularly true where virtual actuator planning techniques are used. As a result, unacceptably long state transitions may be required in the conventional art to allow the expected NVH effects to settle down before completing the transition. This control problem is addressed via the approach set forth hereinabove.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A powertrain comprising:
   a plurality of gear sets;
   a plurality of clutches;
   a plurality of rotatable members;
   a plurality of physical torque actuators each configured to output a corresponding total control torque, wherein the corresponding total control torque from at least one of the torque actuators is used to achieve a target value that is a torque value of a physical target of the powertrain, and wherein the physical target is a member of one of the gear sets, clutches, or rotatable members;
   a controller having tangible, non-transitory memory containing proportional-integral (PI) control logic, wherein a total control torque for the physical target is defined as a sum of a proportional and an integral torque term from the PI control logic for each of the at least one physical torque actuators used to achieve the target value, and wherein the controller is configured to:
      detect a predetermined vehicle event in which an identity of the at least one physical torque actuator used to achieve the target value changes;
      transform a logical representation of the powertrain, using a transformation matrix, from a powertrain using the at least one physical torque actuator to one using at least one virtual torque actuator; and
      automatically reset an integral control torque term for each of the at least one virtual torque actuators used to achieve the target value during the predetermined vehicle event such that the total control torque for the target value is unchanged through the execution of the predetermined vehicle event.

2. The powertrain of claim 1, wherein the predetermined vehicle event is a hybrid range state transition.

3. The powertrain of claim 1, wherein the predetermined vehicle event is a control gain reduction event.

4. The powertrain of claim 1, wherein the plurality of torque actuators includes an internal combustion engine and at least one electric motor/generator unit.

5. The powertrain of claim 4, wherein:
the plurality of gear sets includes first, second, and third gear sets each having a plurality of nodes selected from the group of a sun gear, a ring gear, or a carrier member;
the at least one motor/generator unit includes a first motor/generator unit connected to a node of the first gear set and a second motor/generator unit connected to a node of the second gear set;
the engine is connected to another node of the first gear set; and
the rotating members include a transmission output member connected to a node of the third gear set.

6. The powertrain of claim 1, wherein the controller is configured to automatically reset the integral control torque term of the at least one virtual torque actuator by first resetting the integral control torque term of at least one corresponding virtual actuator used for achieving the same target value, and then transforming each virtual actuator to a corresponding one of the physical torque actuators using another transformation matrix.

7. The powertrain of claim 1, wherein the target value is an input torque to the plurality of gear sets, an output torque from the plurality of gear sets, or a clutch torque.

8. A controller for a hybrid powertrain having a transmission with a plurality of gear sets and a plurality of rotatable members, and a plurality of physical torque actuators each configured to output a corresponding total control torque, wherein a sum of the corresponding total control torques from at least one of the physical torque actuators is used to achieve a target value that is a torque value of a physical target of the hybrid powertrain, and wherein the physical target is a member of one of the gear sets or of one of the rotatable members, the controller comprising:
a processor;
a transceiver in communication with the powertrain; and
tangible, non-transitory memory having proportional-integral (PI) control logic, wherein the processor executes code from the memory to thereby cause the controller to:
detect, via the transceiver, a predetermined vehicle event in which an identity of the at least one physical torque actuator used to achieve the target value changes;
transform a logical representation of the powertrain via the controller using a transformation matrix from using the at least one torque actuator to using at least one virtual torque actuator; and
automatically reset an integral control torque term for each of the at least one virtual torque actuators used to achieve the target value during the predetermined vehicle event such that the total control torque of the target value is unchanged through the execution of the predetermined vehicle event.

9. The controller of claim 8, wherein the predetermined vehicle event is a change in hybrid range state.

10. The controller of claim 9, wherein the change in hybrid range state is a neutral 1-to-neutral 2 state transition, and wherein the physical torque actuator changes from an engine in the neutral 1 state to a pair of motor generators in the neutral 2 state.

11. The controller of claim 8, wherein the predetermined vehicle event is control gain reduction event.

12. The controller of claim 8, wherein the target value is an input torque to the transmission, an output torque of the transmission, or a clutch torque of a clutch of the transmission.

13. A powertrain comprising:
a stationary member;
a first, a second, and a third gear set each having a plurality of nodes selected from the group consisting of a sun gear, a ring gear, and a carrier member;
a plurality of clutches each selectively engageable to connect some of the gear sets to each other or to a stationary member;
a plurality of rotatable members;
a plurality of physical torque actuators each configured to output a corresponding total control torque, wherein a sum of the corresponding total control torques from at least one of the physical torque actuators defines a total control torque used to achieve a target value that is a torque value of a physical target, wherein the physical target is a member of one of the gear sets, the clutches, or the rotatable members, and wherein the plurality of physical torque actuators includes an engine, a first motor/generator unit, and a second motor/generator unit; and
a controller having a processor, tangible, non-transitory memory, and proportional-integral (PI) control logic recorded in the memory wherein the controller is configured to:
detect, via the processor, a hybrid range state transition from a neutral 1-to-neutral 2 state in which the at least one physical torque actuator used to achieve the target value changes from the engine in the neutral 1 state to the first and second motor/generator units in the neutral 2 state;
transform a logical representation of the powertrain, using a transformation matrix, from a powertrain using the at least one physical torque actuator used to achieve the target value to one using the at least one virtual torque actuator; and
automatically reset an integral control torque term for each of the at least one virtual torque actuators used to achieve the target value during the hybrid range state transition, including resetting the integral control torque term of a corresponding virtual torque actuator used for the target value, and then transforming the corresponding virtual torque actuator to the torque actuators in logic of the controller;
wherein automatically resetting the integral control torque terms ensures that the total control torque of the target value is unchanged through the execution of the hybrid range state transition.

14. The powertrain of claim 13, wherein the engine and the first motor/generator unit are connected to different nodes of the plurality of nodes of the first gear set.

15. The powertrain of claim 13, further comprising a clutch and damper assembly disposed between the engine and the first gear set.

16. The powertrain of claim 13, wherein the target value is an input torque to the plurality of gear sets, an output torque from the plurality of gear sets, or a clutch torque.

* * * * *